United States Patent
Benz et al.

(10) Patent No.: US 12,113,335 B2
(45) Date of Patent: Oct. 8, 2024

(54) PRE-CHAMBER SPARK PLUG WITH IMPROVED HEATING BEHAVIOR

(71) Applicant: Robert Bosch GmbH, Stuttgart (DE)

(72) Inventors: Andreas Benz, Bamberg (DE); Matthias Blankmeister, Heiligenhaus (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/547,442

(22) PCT Filed: Dec. 28, 2021

(86) PCT No.: PCT/EP2021/087728
§ 371 (c)(1),
(2) Date: Aug. 22, 2023

(87) PCT Pub. No.: WO2022/184311
PCT Pub. Date: Sep. 9, 2022

(65) Prior Publication Data
US 2024/0154391 A1    May 9, 2024

(30) Foreign Application Priority Data
Mar. 3, 2021    (DE) ...................... 10 2021 202 063.1

(51) Int. Cl.
*H01T 13/18*    (2006.01)
*H01T 13/06*    (2006.01)

(52) U.S. Cl.
CPC ............. *H01T 13/18* (2013.01); *H01T 13/06* (2013.01)

(58) Field of Classification Search
CPC ................................ H01T 13/18; H01T 13/06
See application file for complete search history.

(56) References Cited

U.S. PATENT DOCUMENTS

2015/0128898 A1    5/2015    Osaka

FOREIGN PATENT DOCUMENTS

| DE | 102015220539 A1 | 4/2017 | |
| DE | 102018209970 A1 | 12/2019 | |
| DE | 102018221919 A1 | 6/2020 | |
| DE | 102019201570 A1 | 8/2020 | |
| WO | 2007092972 A1 | 8/2007 | |
| WO | WO-2019242930 A1 * | 12/2019 | ............. H01T 13/32 |

OTHER PUBLICATIONS

Machine translation of WO 2019242930A1 (Year: 2019).*
International Search Report for PCT/EP2021/087728, Issued Apr. 12, 2022.

* cited by examiner

*Primary Examiner* — Anne M Hines
(74) *Attorney, Agent, or Firm* — NORTON ROSE FULBRIGHT US LLP; Gerard A. Messina

(57) ABSTRACT

A pre-chamber spark plug. The pre-chamber spark plug includes a housing, a pre-chamber, a cap that closes the pre-chamber on the housing and that has one or more through-openings, and an ignition device situated in the pre-chamber. The cap has a cap base and a cap jacket. The cap jacket and a housing inner wall of the housing defines a pre-chamber inner wall. The pre-chamber is defined by the pre-chamber inner wall and the cap base. At least one rib projects into the pre-chamber is formed in the region of the pre-chamber inner wall.

16 Claims, 5 Drawing Sheets

PRE-CHAMBER SPARK PLUG WITH IMPROVED HEATING BEHAVIOR

FIELD

The present invention relates to a pre-chamber spark plug with improved heating behavior, in particular of caps of the pre-chamber spark plugs.

BACKGROUND INFORMATION

Pre-chamber spark plugs are described in the related art in various embodiments. A main area of use of pre-chamber spark plugs is in stationary gas engines, which usually run at an operating point with a high load. For stationary gas engines of this type, the result is sometimes excessive heating, which can lead to unwanted glow ignitions of the pre-chamber spark plug. German Patent Application No. DE 10 2018 221 919 A1 describes a pre-chamber spark plug was proposed that has reinforced material accumulations on a cap base. When using a pre-chamber spark plug in a mobile internal combustion engine of a vehicle, however, different problems result. In particular, after a cold start and in a partial load range of the internal combustion engines, there is the problem that the pre-chamber spark plug does not have a high temperature in the area of the cap in order to guarantee a stable combustion process and reliable ignition within the pre-chamber of the pre-chamber spark plug. This can result in an undesirable operating behavior of the internal combustion engine of the vehicle. It would therefore be desirable to have an improved pre-chamber spark plug for use in a mobile internal combustion engine of a vehicle.

SUMMARY

A pre-chamber spark plug according to the present invention may has the advantage that a stable combustion process can be achieved even after a cold start of a mobile internal combustion engine or in a partial load operation of the mobile internal combustion engine. In particular, an advantageous heating behavior of a cap of the pre-chamber spark plug can be achieved. This enables an operationally reliable use of pre-chamber spark plugs in mobile internal combustion engines, for example of vehicles. According to an example embodiment of the present invention, this is achieved in that the pre-chamber spark plug includes a housing, a pre-chamber and a cap. The cap closes the pre-chamber on the housing and has a plurality of through-openings. An ignition device is situated in the pre-chamber. In addition, the cap has a cap base and a cap jacket. The cap jacket and a housing inner wall of the housing define a pre-chamber inner wall, the pre-chamber then being defined by the pre-chamber inner wall and the cap base. Here, in the area of the pre-chamber inner wall at least one rib, or the like, projecting into the pre-chamber is formed. Through the ribs projecting into the pre-chamber, it is possible for a temperature in the pre-chamber to be increased so that a reliable ignition is ensured even during a cold start of an internal combustion engine and in the partial load range, as these occur for example in vehicles. Preferably, the temperature is kept above a temperature threshold of 500° C. The inwardly projecting rib allows an enlargement of a surface area as well as of a volume of the components defining the pre-chamber. The ribs here form an additional heat accumulator, so that the internal combustion engine enables a reliable cold start behavior and partial load operation without misfiring.

Preferred developments of the present invention are disclosed herein.

According to an example embodiment of the present invention, preferably, the rib is situated on the cap jacket. This makes it possible for a temperature in the pre-chamber to be increased or to remain at a high level. As a result, a gas flowing into the pre-chamber via the through-openings can be additionally and more rapidly heated, thus improving a readiness for ignition. Alternatively, the rib on the housing of the pre-chamber spark plug is situated on the inner wall of the housing. Also as a result of this, a temperature inside the pre-chamber and the temperature of an inflowing gas can be increased, whereby due to the lack of contact of the rib to the cap, a cap temperature is not increased. As a result, a particularly robust and long-lived pre-chamber spark plug can be provided.

According to an example embodiment of the present invention, particularly preferably, the through-opening is situated in the cap in such a way that a gas flow of inflowing gas flowing from a combustion chamber through the through-opening into the pre-chamber is directed onto the rib. This allows the inflowing gas to absorb heat at the rib, which can significantly improve the ignition properties in the subsequent ignition process of the pre-chamber spark plug.

According to an example embodiment of the present invention, the rib is preferably oriented non-parallel to a center axis of the pre-chamber spark plug. That is, a longitudinal axis of the rib does not run parallel to the center axis of the pre-chamber spark plug. In this way, in particular a deflection of the inflowing gas in accordance with the existing geometry in the pre-chamber can be achieved, so that it can always be ensured that an ignitable mixture is present in the region of the ignition device of the pre-chamber spark plug. The rib thus also has a gas-conducting function.

According to an example embodiment of the present invention, the height of the rib is preferably greater than 0.5 mm. A width of the rib is preferably greater than 0.5 mm and a length of the rib is preferably greater than 1 mm.

Preferably, according to an example embodiment of the present invention, the rib has a bevel in an area where the gas flow of the inflowing gas from the through-opening meets the rib when flowing in. This beveling can provide an additional deflection and/or mixing of gases within the pre-chamber.

Particularly preferably, according to an example embodiment of the present invention, one or more intermediate spaces are provided between the rib and the inner wall of the pre-chamber. Preferably, the rib can be fixed to the pre-chamber inner wall at only one point or at a short area, and there is an intermediate space between the pre-chamber inner wall and the remaining area of the rib. This makes it possible for a temperature of the rib to be kept high in a targeted manner and, due to the small area of contact with the inner wall of the pre-chamber, for as little heat loss as possible to occur at the rib due to heat conduction. Furthermore, this can prevent, for example, heat conduction to the inner wall of the pre-chamber and, in particular, to the cap jacket, so that the rib has an increased temperature but the cap does not.

Further preferably, according to an example embodiment of the present invention, the rib is made of a different material from the cap and of a different material from the housing. The rib is preferably made of an alloy containing nickel.

Particularly preferably, according to an example embodiment of the present invention, a plurality of ribs is provided on the inner wall of the pre-chamber. The ribs are further preferably rectilinear or curved in shape. Preferably, a cross-section of the ribs is constant.

In order to minimize a heat exchange between the rib and the inner wall of the pre-chamber, the rib preferably has a reduced width at a rib foot at which the rib is fixed to the pre-chamber inner wall.

Further preferably, according to an example embodiment of the present invention, no rib is situated at the cap base. The rib-free cap base can thus prevent the cap base, which is usually subjected to very high thermal loads during operation, from additionally experiencing a thermal load through the rib.

In addition, the present invention relates to a mobile internal combustion engine, in particular for a vehicle, having a pre-chamber spark plug according to the present invention.

BRIEF DESCRIPTION OF THE DRAWINGS

In the following, preferred exemplary embodiments of the present invention are described in detail with reference to the figures.

DETAILED DESCRIPTION OF EXAMPLE EMBODIMENTS

In the following, a pre-chamber spark plug according to a preferred first exemplary embodiment of the present invention is described in detail with reference to FIGS. 1 and 2.

Figure 1:
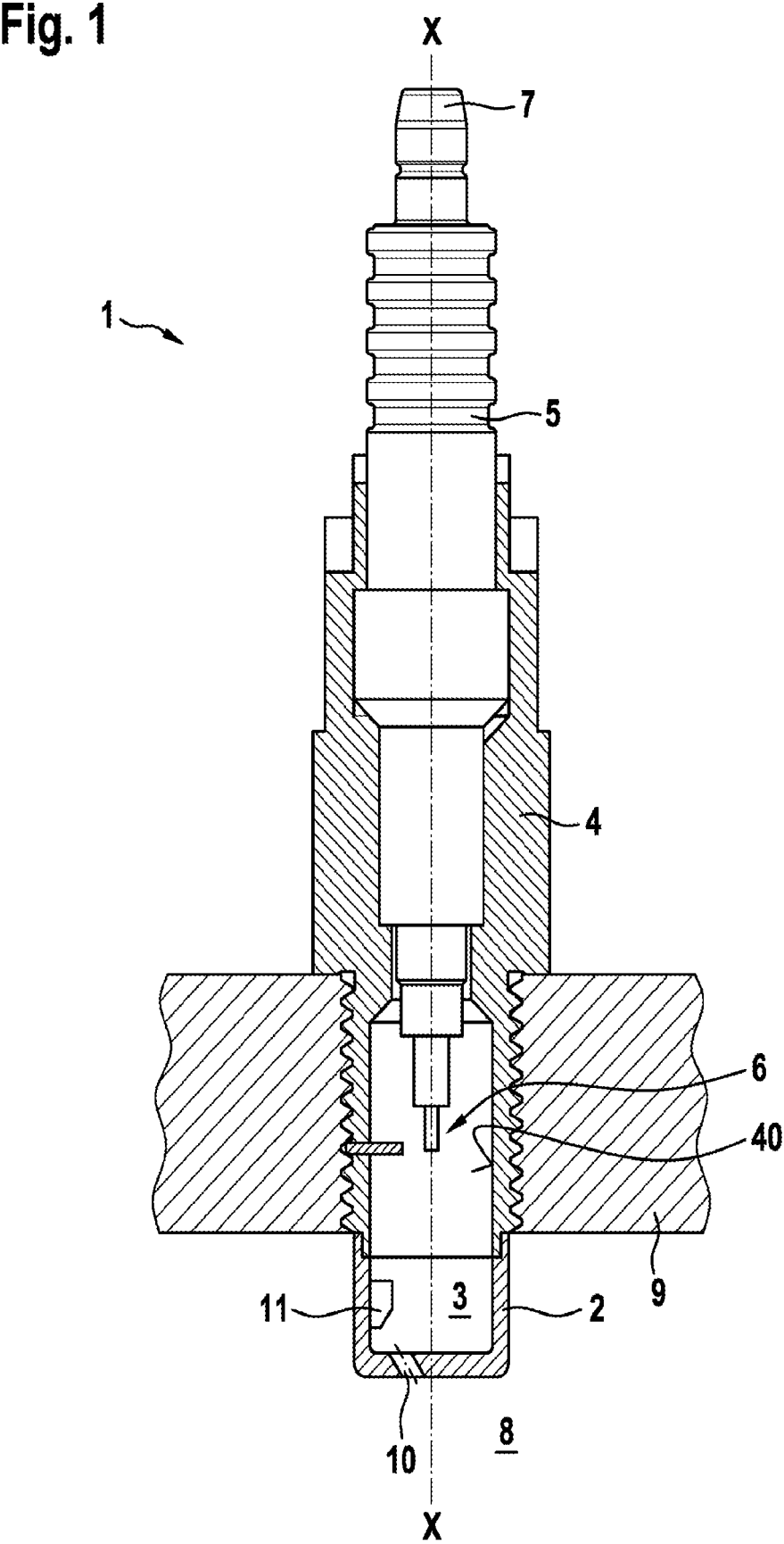
FIG. 1 is a schematic sectional view of a pre-chamber spark plug according to a first preferred example embodiment of the present invention.

As can be seen from FIG. 1, the pre-chamber spark plug 1 has a cap 2 which, together with a housing 4, forms a pre-chamber 3 at an end of the pre-chamber spark plug directed towards a combustion chamber 8. The pre-chamber spark plug 1 is shown schematically in FIG. 1 and further comprises an insulator 5 and an electrical terminal 7. An ignition device 6 with a center electrode and a ground electrode is situated in the pre-chamber 3.

As can be seen further from FIG. 1, pre-chamber spark plug 1 is screwed in in a cylinder head 9 in such a way that the cap 2 projects into a combustion chamber 8. As a result, cap 2 is directly exposed to high temperatures in the combustion chamber.

Figure 2:
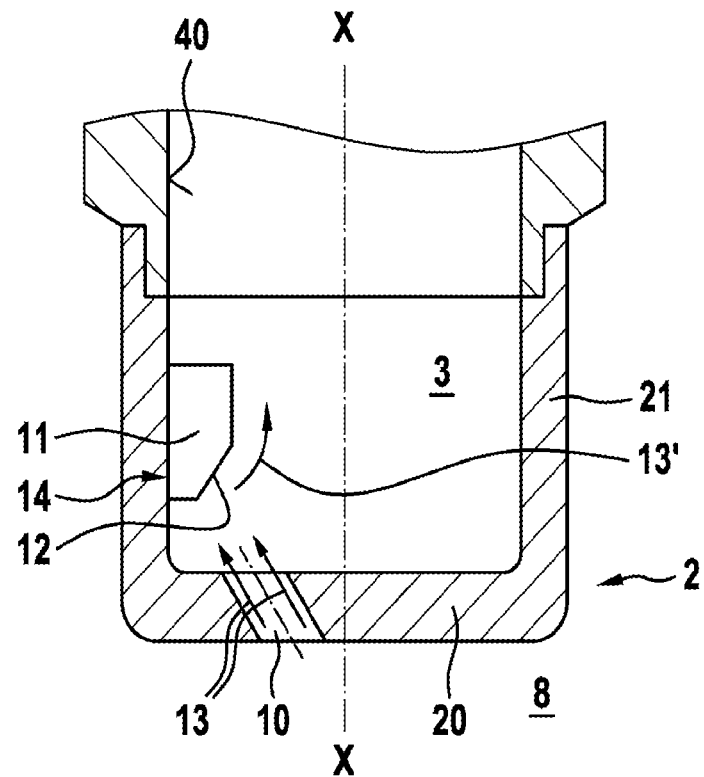
FIG. 2 is a schematic sectional view of a pre-chamber area of the pre-chamber spark plug of FIG. 1.

The cap 2 can be seen in detail in FIG. 2. In section, cap 2 has a substantially cup-shaped structure and includes a cap base and a cylindrical cap jacket 21. Multiple through-openings 10 are formed in cap base 20. In FIG. 2 only one through-opening is shown.

During operation, there is a gas flow 13 into pre-chamber 3 through the through-openings 10, by which an ignitable mixture is fed into pre-chamber 3.

The cap jacket 21 and a housing inner wall 40 define a pre-chamber inner wall. The pre-chamber 3 is then defined by the pre-chamber inner wall and cap base 20.

As can be seen in particular from FIG. 2, on the inside of cap jacket 21 an elongated rib 11 is formed, which projects into pre-chamber 3. Here rib 11 has a bevel 12 at an end oriented toward cap base 20. Cap base 20 is free of ribs and has a constant thickness.

Rib 11 is an elongated component having a longitudinal dimension greater than a height, i.e. the region of the rib projecting into pre-chamber 3, and a width of the rib. The height and width of the rib are preferably the same.

Rib 11 is connected to cap jacket 21, for example by welding, at its entire rib foot, which forms a fixing region 14 of the rib.

During operation, a gas flow 13 from combustion chamber 8 is fed through the through-opening 10 in the direction onto rib 11. Gas flow 13 is an ignitable mixture that should move as closely as possible into the region of ignition device 6. As can be seen in FIG. 2, gas flow 13 impinges directly on bevel 12. This results in a deflection 13 of the gas flow in the direction of ignition device 6. In this way it can be ensured that the ignitable mixture is as close as possible to the region of ignition device 6 in order to enable a reliable ignition in pre-chamber 3.

In addition, rib 11 enlarges a cap surface of pre-chamber 3, as well as a cap volume. Heat of the cap 2 resulting from the combustion process is therefore also transferred to rib 11 via cap jacket 21. This increases a temperature at rib 11. The higher temperatures at rib 11 cause a heat input into the inflowing gas flow 13, which results in a more stable combustion in pre-chamber 3 and thus in an improved ignition in combustion chamber 8.

In addition, a flow path of gas flow 13 can be influenced by the situation of rib 3, thereby improving an optimized residual gas purging and also fresh gas replenishment of pre-chamber 3.

In this embodiment, rib 11 runs parallel to a center axis of pre-chamber spark plug 1. The rib 11 is preferably made of a material that has a poorer thermal conductivity than the material of cap 2. This allows rib 11 to be kept at a relatively high temperature compared to cap 2.

In this way, through the pre-chamber spark plug according to the present invention a heating behavior of a gas flow 13 flowing into pre-chamber 3 can be significantly improved. As a result, pre-chamber spark plug 1 is designed in particular for use in mobile internal combustion engines, for example in vehicles, and has advantages in particular for cold starting and in partial load operation of the internal combustion engine.

In the following, further preferred embodiments of the present invention are described in detail with reference to FIGS. 3 through 9. In the Figures described below, identical or nearly identical parts are designated as in the first exemplary embodiment.

Figure 3:
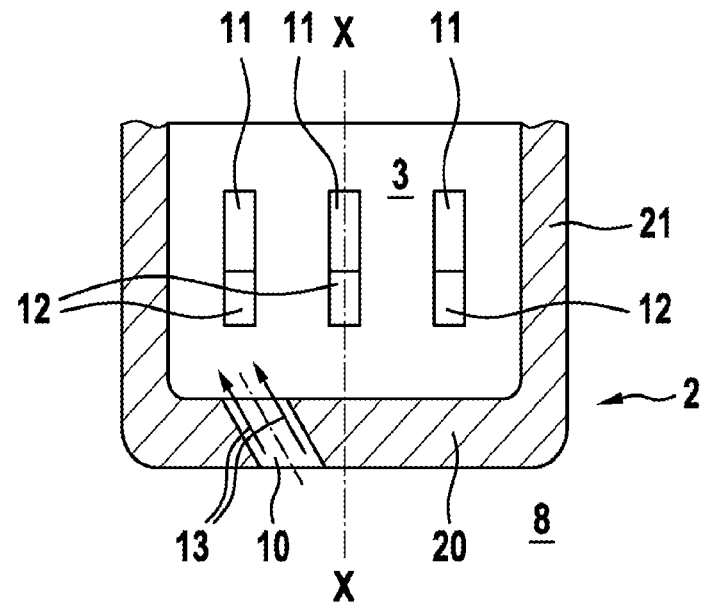
FIG. 3 is a schematic sectional view of a pre-chamber area of a pre-chamber spark plug according to a second exemplary embodiment of the present invention.

FIG. 3 shows a schematic sectional view of a pre-chamber spark plug 1 according to a second exemplary embodiment of the present invention. As can be seen from FIG. 3, in the second embodiment a plurality of ribs 11 are situated along the inner circumference of the cap jacket 21. Here ribs 11 run parallel to the center axis. On the inside of cap base 20, no rib or other type of raised part is provided.

Figure 4:
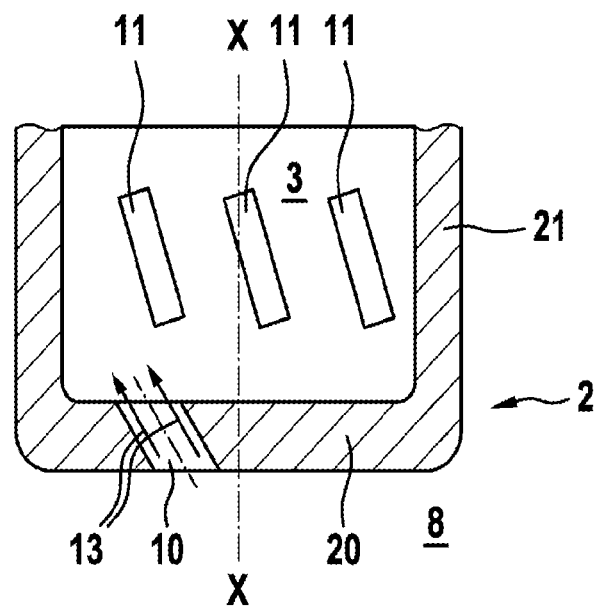
FIG. 4 is a schematic sectional view of a pre-chamber area of a pre-chamber spark plug according to a third exemplary embodiment of the present invention.

FIG. 4 shows a fourth embodiment of the present invention that substantially corresponds to the embodiment shown in FIG. 3. In contrast to the embodiment of FIG. 3, in the third exemplary embodiment ribs 11 are not oriented parallel to the center axis X-X of the pre-chamber spark plug. Furthermore, the ribs running in a straight line are also formed without a bevel 12. Through-opening 10 is here preferably parallel to the ribs. Ribs 11 here ensure a stabilization of the flow in pre-chamber 3.

Figure 5:
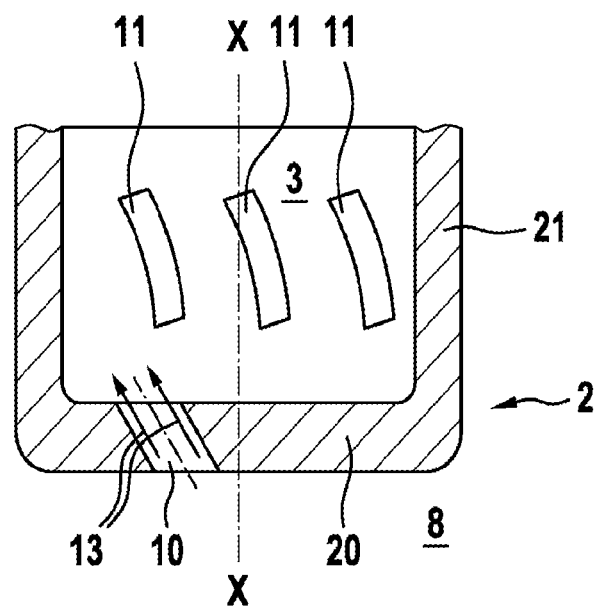
FIG. 5 is a schematic sectional view of a pre-chamber area of a pre-chamber spark plug according to a fourth exemplary embodiment of the present invention.

The fourth embodiment shown in FIG. 5 corresponds substantially to the third embodiment, but differing therefrom the ribs 11 are curved. This makes it possible for gas flow 13 to undergo a deflection at ribs 11, for example in order to impose a swirl on the gas flow inside pre-chamber 3.

Figure 6:
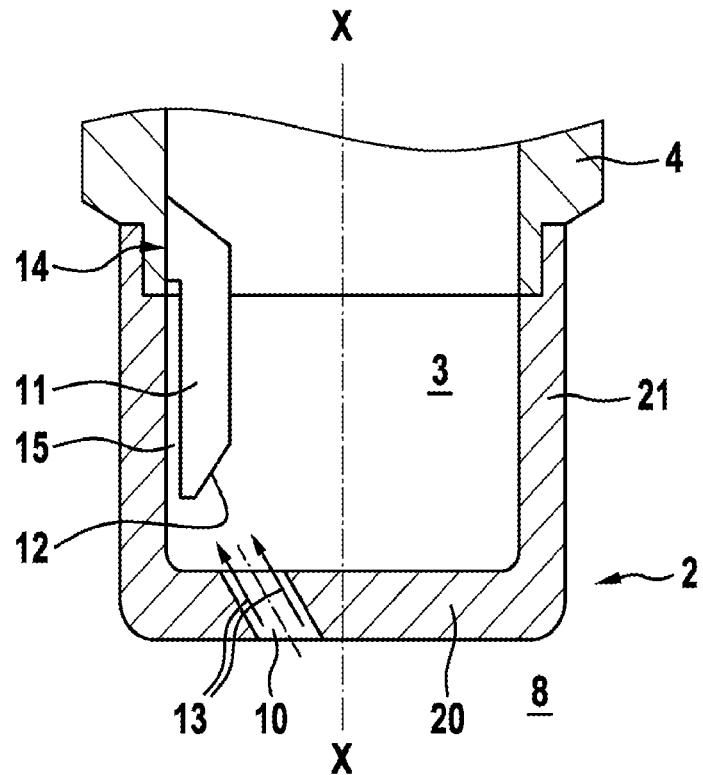
FIG. 6 is a schematic sectional view of a pre-chamber area of a pre-chamber spark plug according to a fifth exemplary embodiment of the present invention.

FIG. 6 shows a pre-chamber spark plug according to a fifth exemplary embodiment of the present invention. Differing from the above-described exemplary embodiments, in the fifth embodiment a fixing of ribs 11 is different. As shown in FIG. 6, rib 11 is not fixed to cap jacket 21 over its entire length, as in the above-described embodiments, but has a smaller fixing area 14.

In the assembled state, as shown in FIG. 6, this results in an intermediate space 15 between rib 11 and cap jacket 21. As can be seen from FIG. 6, in this embodiment rib 11 is fixed to the inside of the housing 4. Here rib 11 runs in the direction to cap base 20 parallel to the center axis X-X. This embodiment is advantageous in that no temperature increase occurs directly at cap 2 due to rib 11, because rib 11 is fixed only to housing 4. Thus, rib 11 has no effect on a temperature of cap 2.

Figure 7:
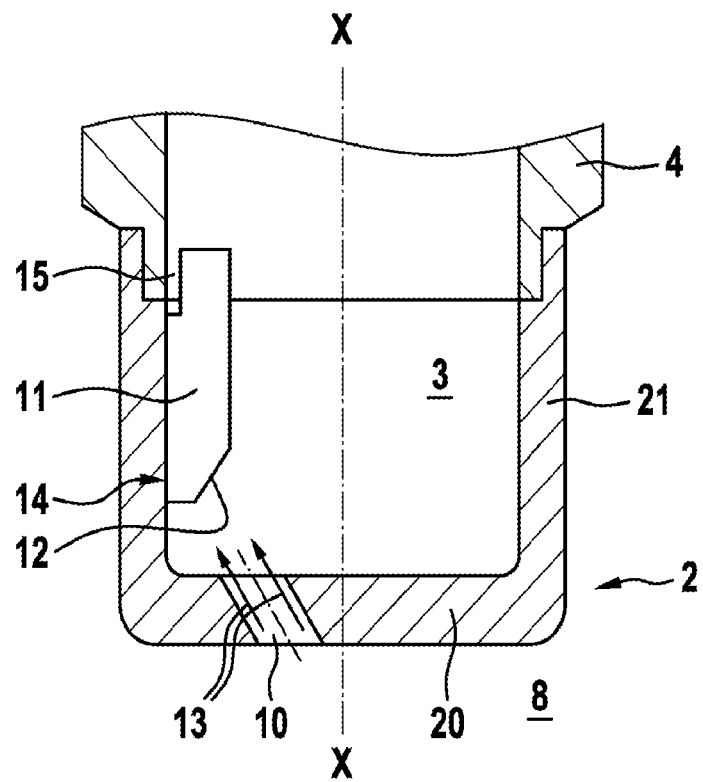
FIG. 7 is a schematic sectional view of a pre-chamber area of a pre-chamber spark plug according to a sixth exemplary embodiment of the present invention.

FIG. 7 shows a sixth exemplary embodiment that is similar to the embodiment shown in FIG. 6. The rib 11 also has a fixing region 14 having a small surface. However, rib 11 of the sixth embodiment is fixed to cap 2, more precisely to cap jacket 21. The reduced connection of the rib 11 here reduces a dissipation of heat to the cap. An intermediate space 15 is formed here between rib 11 and housing 4.

Figure 8:
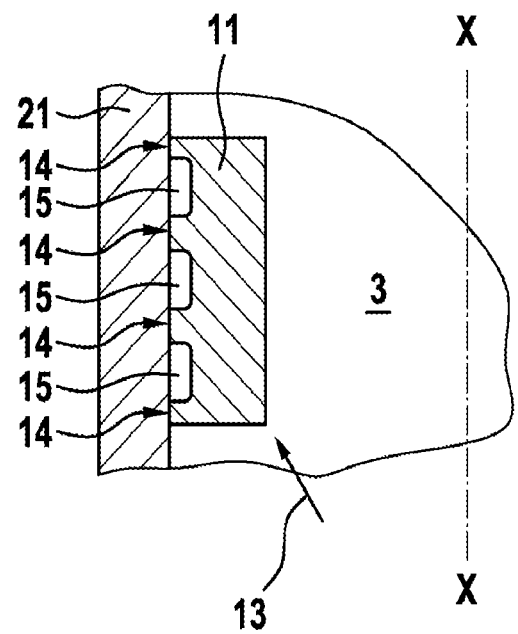
FIG. 8 is a schematic sectional view of a pre-chamber area of a pre-chamber spark plug according to a seventh exemplary embodiment of the present invention.

FIG. 8 shows a seventh exemplary embodiment of the present invention. As can be seen from FIG. 8, in the seventh embodiment rib 11 is connected to cap jacket 21 at a plurality of individual small fixing areas 14. Intermediate spaces 15 are provided between each of the individual fixing areas 14. Fixing areas 14 can be, for example, point-like connections or line-like connections. As a result, a heat input into cap 2 can be further reduced.

Figure 9:
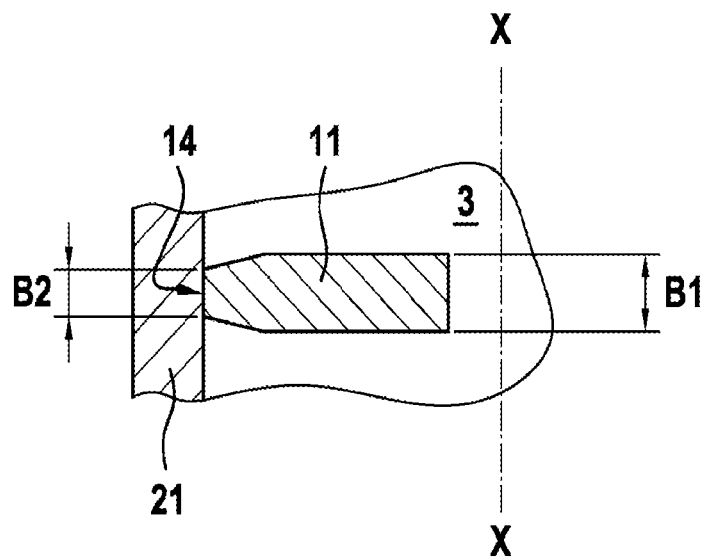
FIG. 9 is a schematic sectional view of a pre-chamber area of a pre-chamber spark plug according to an eighth exemplary embodiment of the present invention.

FIG. 9 shows a pre-chamber spark plug having a rib 11 according to an eighth exemplary embodiment of the present invention. As can be seen from FIG. 9, rib 11 has a first width B1 on a main body of the rib. Rib 11 is connected to cap jacket 21 at a fixing area 14. As shown in FIG. 9, at fixing area 14 rib 11 has a second width B2 that is smaller than first width B1. This reduces a contact area between rib 11 and cap jacket 21, so that a heat transfer from rib 11 to cap 2 is reduced. This can prevent high temperatures of cap 2 due to the provision of ribs 11.

For all the described embodiments, it is to be noted that the described, different ribs 11 can each be fixed either to cap 2 or to housing 4 and project into pre-chamber 3. It is also possible for a plurality of geometrically differently shaped ribs 11 to be used on one pre-chamber spark plug. Here, any desired combinations of the different ribs 11 shown in embodiments 1 through 8 are possible. For all the embodiments, it should further be noted that ribs 11 are preferably made of a different material from cap 2 and housing 4, preferably of a nickel-containing alloy. Ribs 11 can be welded or soldered to cap 2 or housing 4 or fixed to these components by some other connection technique. Alternatively, ribs 11 are manufactured by an additive manufacturing process or MIM manufacturing process.

What is claimed is:

1. A pre-chamber spark plug, comprising:
a housing;
a pre-chamber;
a cap that closes the pre-chamber on the housing and that has one or more through-openings; and
an ignition device situated in the pre-chamber;
wherein the cap has a cap base and a cap jacket, the cap jacket and a housing inner wall of the housing defining a pre-chamber inner wall, and the pre-chamber being defined by the pre-chamber inner wall and the cap base,
wherein at least one elongated rib projecting into the pre-chamber is formed in an area of the pre-chamber inner wall, and
wherein the area is inside the cap jacket, and wherein the elongated rib has a longitudinal dimension greater than a height of the elongated rib.

2. The pre-chamber spark plug as recited in claim 1, wherein the rib is situated on the cap jacket, and/or the rib is situated on the housing.

3. The pre-chamber spark plug as recited in claim 1, wherein the cap base has no rib, and/or the cap is cup-shaped in section and/or the at least one through-opening is formed in the cap base.

4. The pre-chamber spark plug as recited in claim 1, wherein the elongated rib has a bevel at an end oriented toward the cap base.

5. A pre-chamber spark plug, comprising:
a housing;
a pre-chamber;
a cap that closes the pre-chamber on the housing and that has one or more through-openings; and
an ignition device situated in the pre-chamber;
wherein the cap has a cap base and a cap jacket, the cap jacket and a housing inner wall of the housing defining a pre-chamber inner wall, and the pre-chamber being defined by the pre-chamber inner wall and the cap base,
wherein at least one rib projecting into the pre-chamber is formed in an area of the pre-chamber inner wall, and
wherein the through-opening in the cap is situated such that a gas flow of inflowing gas through the through-opening is directed onto the rib.

6. The pre-chamber spark plug as recited in claim 5, wherein the rib runs non-parallel to a center axis of the pre-chamber spark plug.

7. The pre-chamber spark plug as recited in claim 5, wherein the rib has a bevel on a region on which the gas flow from the through-opening impinges when flowing into the pre-chamber.

8. A pre-chamber spark plug, comprising:
a housing;
a pre-chamber;

a cap that closes the pre-chamber on the housing and that has one or more through-openings; and an ignition device situated in the pre-chamber;

wherein the cap has a cap base and a cap jacket, the cap jacket and a housing inner wall of the housing defining a pre-chamber inner wall, and the pre-chamber being defined by the pre-chamber inner wall and the cap base, wherein at least one rib projecting into the pre-chamber is formed in an area of the pre-chamber inner wall, and wherein the rib is made of a different material from the cap and of a different material from the housing.

9. A pre-chamber spark plug, comprising:

a housing;

a pre-chamber;

a cap that closes the pre-chamber on the housing and that has one or more through-openings; and an ignition device situated in the pre-chamber;

wherein the cap has a cap base and a cap jacket, the cap jacket and a housing inner wall of the housing defining a pre-chamber inner wall, and the pre-chamber being defined by the pre-chamber inner wall and the cap base, wherein at least one rib projecting into the pre-chamber is formed in an area of the pre-chamber inner wall, and wherein the at least one rib includes a plurality of ribs which have the same geometrical dimensions.

10. The pre-chamber spark plug as recited in claim 9, wherein the ribs run in a straight line, and/or the ribs run in a curve.

11. A pre-chamber spark plug, comprising:

a housing;

a pre-chamber;

a cap that closes the pre-chamber on the housing and that has one or more through-openings; and an ignition device situated in the pre-chamber;

wherein the cap has a cap base and a cap jacket, the cap jacket and a housing inner wall of the housing defining a pre-chamber inner wall, and the pre-chamber being defined by the pre-chamber inner wall and the cap base, wherein at least one rib projecting into the pre-chamber is formed in an area of the pre-chamber inner wall, and wherein the rib has a reduced width at a fixing region at which a fixing to the pre-chamber inner wall takes place.

12. An internal combustion engine of a vehicle, comprising:

a pre-chamber spark plug, including:

a housing, a pre-chamber, a cap that closes the pre-chamber on the housing and that has one or more through-openings, and an ignition device situated in the pre-chamber;

wherein the cap has a cap base and a cap jacket, the cap jacket and a housing inner wall of the housing defining a pre-chamber inner wall, and the pre-chamber being defined by the pre-chamber inner wall and the cap base, and wherein at least one elongated rib projecting into the pre-chamber is formed in an area of the pre-chamber inner wall, and wherein the area is inside the cap jacket, and wherein the elongated rib has a longitudinal dimension greater than a height of the elongated rib.

13. The internal combustion engine as recited in claim 12, wherein the elongated rib has a bevel at an end oriented toward the cap base.

14. The internal combustion engine as recited in claim 12, wherein the through-opening in the cap is situated such that a gas flow of inflowing gas through the through-opening is directed onto the elongated rib.

15. The internal combustion engine as recited in claim 12, wherein the elongated rib is made of a different material from the cap and of a different material from the housing.

16. The internal combustion engine as recited in claim 12, wherein the at least one elongated rib includes a plurality of elongated ribs which have the same geometrical dimensions.

* * * * *